United States Patent [19]
Motz et al.

[11] Patent Number: 5,752,784
[45] Date of Patent: May 19, 1998

[54] LOW PROFILE DRAINAGE NETWORK FOR ATHLETIC FIELD DRAINAGE SYSTEM

[75] Inventors: Joseph E. Motz; Mark A. Heinlein, both of Concinnati; James B. Goddard, Powell; Carl Tyner, Hamilton, all of Ohio

[73] Assignee: The Motz Group, Cincinnati, Ohio

[21] Appl. No.: 390,556

[22] Filed: Jan. 17, 1995

[51] Int. Cl.$^6$ .............................. E02B 11/00; E02B 13/00

[52] U.S. Cl. .................. 405/37; 405/38; 405/43; 405/57

[58] Field of Search .................. 405/43, 36–40, 405/45, 51, 52; 47/48.5 R, 48.5 CR

[56] References Cited

U.S. PATENT DOCUMENTS

| | | | |
|---|---|---|---|
| 1,895,324 | 1/1933 | Heacock | 405/39 |
| 2,432,887 | 12/1947 | Haviland . | |
| 3,425,555 | 2/1969 | Ridgeway . | |
| 3,706,319 | 12/1972 | Neese et al. | 137/205 |
| 3,908,385 | 9/1975 | Daniel et al. . | |
| 4,023,506 | 5/1977 | Robey | 111/1 |
| 4,246,925 | 1/1981 | Oldfelt | 137/205 |
| 4,268,993 | 5/1981 | Cunningham | 47/58 |
| 4,293,237 | 10/1981 | Robey et al. | 405/43 X |
| 4,333,487 | 6/1982 | Michael | 137/2 |
| 4,333,830 | 6/1982 | Michael | 210/170 |
| 4,339,232 | 7/1982 | Campbell | 137/205 X |
| 4,576,511 | 3/1986 | Vidal, Jr. | 405/37 |
| 4,704,047 | 11/1987 | Oldfelt et al. | 405/37 |
| 4,832,526 | 5/1989 | Funkhouser, Jr. | 405/43 |
| 4,881,846 | 11/1989 | Burkstaller | 405/37 |
| 4,904,113 | 2/1990 | Goddard et al. | 405/45 |
| 4,913,596 | 4/1990 | Lambert, III | 405/43 |
| 4,930,934 | 6/1990 | Adkins | 405/37 |
| 4,932,257 | 6/1990 | Webb | 405/52 X |
| 4,948,294 | 8/1990 | Mercier | 405/37 |
| 5,064,308 | 11/1991 | Almond et al. | 405/43 |

(List continued on next page.)

FOREIGN PATENT DOCUMENTS

| | | |
|---|---|---|
| 437423 | 1/1971 | Australia . |
| 111978 | 9/1964 | Czech Rep. . |
| 0199598 | 4/1987 | European Pat. Off. . |
| 2405330 | 6/1979 | France . |
| 2569434 | 2/1986 | France . |
| 924931 | 3/1955 | Germany . |
| 938850 | 2/1956 | Germany . |
| 1910641 | 9/1970 | Germany . |
| 1945067 | 9/1971 | Germany . |
| 2525114 | 12/1976 | Germany . |
| 2727954a1 | 1/1979 | Germany . |
| 2727955A1 | 1/1979 | Germany . |
| 2727956A1 | 10/1979 | Germany . |
| 4017115 | 12/1990 | Germany . |
| 482615 | of 1953 | Italy . |
| A475980 | 6/1973 | U.S.S.R. . |

*Primary Examiner*—Tamara L. Graysay
*Assistant Examiner*—Frederick L. Lagman
*Attorney, Agent, or Firm*—Wood, Herron & Evans, L.L.P.

[57] ABSTRACT

A drainage system for a natural turf athletic field includes a buried drainage network located above a water impermeable membrane which conforms to the topography of a compacted subsoil, the drainage network including a plurality of water impermeable pipe rows partially recessed in depressions in the subsoil and a plurality of water permeable conduit rows oriented perpendicular to and intersecting the pipe rows. At each intersection, a low profile coupling interconnects the respective pipe row to the respective conduit row, the coupling having a vertical dimension less than the combined vertical dimension of the pipe rows and the conduit rows. A fill layer covers the membrane and supports natural turf thereabove. The drainage network connects to a a gravity drain and a water supply. The design of the drainage network results in reduced excavation and simplified construction, thereby lowering the installation cost for the system. The system may also include a subsystem for vacuum-enhanced drainage, or irrigation and sensors for automatically initiating these features.

35 Claims, 5 Drawing Sheets

U.S. PATENT DOCUMENTS

| | | | |
|---|---|---|---|
| 5,074,708 | 12/1991 | McCann, Sr. | 405/38 |
| 5,120,157 | 6/1992 | Todd, Sr. et al. | 405/36 |
| 5,120,158 | 6/1992 | Husu | 405/43 |
| 5,163,781 | 11/1992 | Husu | 405/43 |
| 5,219,243 | 6/1993 | McCoy | 405/43 |
| 5,221,158 | 6/1993 | Norsworthy | 405/43 |
| 5,222,831 | 6/1993 | Todd, Sr et al. | 405/36 |
| 5,350,251 | 9/1994 | Daniel et al. | 405/37 |

LOW PROFILE DRAINAGE NETWORK FOR ATHLETIC FIELD DRAINAGE SYSTEM

FIELD OF THE INVENTION

Generally, this invention relates to a drainage system for an outdoor athletic surface. More particularly, this invention relates to a low profile drainage network which forms part of a drainage system for a natural turf athletic field, for advantageous use in gravity or vacuum-enhanced drainage of the field.

BACKGROUND OF THE INVENTION

Daniel et al. U.S. Pat. No. 3,908,385, issued Sep. 30, 1975 and entitled "Planted Surface Conditioning System", discloses a drainage system which utilizes vacuum to promote drainage of a natural turf athletic field. The system includes a water impermeable membrane over a compacted subsoil, covered by a fill layer of sand with a drainage network buried therein and a natural turf playing surface on top. Some of the pipes in the drainage network are fluid permeable, and vacuum may be applied to the network to assist gravity drainage during periods of heavy rainfall. Even without this feature of vacuum-enhanced drainage, the configuration of the subsurface components, and particularly the use of a horizontal water impermeable membrane, provides advantages in controlling the water level in the system.

One stated objective of Daniel '385 was to overcome problems associated with artificial turf athletic fields. In the twenty years since the filing of Daniel '385, many others in the athletic field business have also come to acknowledge the deficiencies of artificial turf fields. One such deficiency relates to the relatively higher injury rate for athletes performing on artificial turf, compared to natural turf. Also, while artificial turf does not require the service and care of natural turf, it does require maintenance, in the form of vacuum sweeping, painting, seam repair, etc. Also, the initial installation expenses are relatively high. Moreover, the resilience of an artificial turf field typically worsens with time. In short, experience acquired over the past twenty years confirms the importance of the work done by Mr. Daniel in the early and mid-1970's with respect to designing and developing natural turf athletic fields which provide a relatively high degree of control over drainage.

Since their introduction in the 1970's, and particularly within the past ten years, drainage systems with vacuum-enhanced capability have increased in popularity with athletes, with fans and with those responsible for purchasing and maintaining athletic fields. In heavy rain, the faster drainage keeps the field from being torn up too badly during sports such as football, and it also allows play to resume more quickly for sports such as baseball.

Particularly at the collegiate level, it has long been recognized that the best athletic facilities help to attract top recruits. For instance, in the early 1970's a number of major college football programs in the U.S. installed artificial turf fields to assist in recruiting football players. Many of these same schools still try to attract prospective athletes by showing that they have the best facilities available. However, in the present day, because of the continued success and good reputation of Mr. Daniel's original invention, this maxim translates to a desire for a natural turf athletic field with the vacuum-enhanced drainage feature, whether for football, soccer, baseball, etc.

Turf science and maintenance play significant roles in the performance of any vacuum-enhanced or water level controlled natural turf field. However, the relatively high initial cost of buying and installing the components of such a system are probably the most important factors considered when the decision to purchase such a system is made. Thus, while there exists a growing desire for such systems in the market, the systems must meet or exceed performance expectations when in use, and they must also be economically feasible at the outset. Due to ever-tightening budgets, even the most successful professional and university teams are extremely cost-conscious about their athletic facilities.

Partially in recognition of these economic realities, Mr. Daniel improved upon his original athletic field drainage system with vacuum-enhanced drainage capability. These improvements are set forth in U.S. Pat. No. 5,350,251, issued Sep. 27, 1994 and entitled "Planted Surface Moisture Control System". The system disclosed in Daniel '251 results in reduced installation and construction costs for a drainage system by eliminating the underground concrete vacuum pump pits used in earlier systems. Daniel '251 indicates that such underground concrete pump pits were relatively expensive, were required to meet stringent building requirements which varied from community to community, and sometimes required the removal of existing stadium sections.

Thus, one primary objective of the system of Daniel '251 related to reducing the cost of the vacuum-enhanced drainage feature for an athletic field drainage system. It is an object of this invention to follow this lead one step further, to further reduce the time and costs associated with installing and constructing a drainage system for an athletic field, with or without vacuum-enhanced drainage capability.

Another object of the present invention relates to the recognition that not all entities in the market for a natural turf athletic field have a need for initial installation of a high tech, or "cadillac", version of such a system. For instance, many small colleges or high schools simply cannot afford to spend the relatively large amounts of money on athletic facilities that are spent by some professional teams or major universities. Nevertheless, for these entities, there still remains a strong desire to obtain the best facilities possible within the given financial constraints. This includes the desire to purchase and install natural turf athletic fields which have the advantages of consistent drainage, a level playing surface and the ability to exercise some degree of control over the moisture content of the natural turf and the fill layers residing therebeneath, regardless of whether or not the system also provides the feature of vacuum-enhanced drainage to accommodate periods of heavy rainfall.

It is another object of the invention to meet the needs of these entities by improving the degree of control over the drainage or moisture content of a natural turf athletic field, regardless of whether or not achievement of this control includes the feature of vacuum-enhanced drainage.

Some entities may desire an athletic field with optimum capabilities, particularly vacuum-enhanced drainage, but this desire for these optimum capabilties may not become apparent until after a prior system has already been installed. In these instances, there is a need to supply improved features for an athletic field, such as vacuum-enhanced drainage, after the system has already been installed. Accordingly, it is still another object of the invention to facilitate the upgrading of an in-place drainage system for an athletic field, to add improvement features such as vacuum-enhanced drainage.

For a number of presently in-place systems which provide vacuum-enhanced drainage for an athletic field, the systems were originally designed to achieve vacuum-enhanced drainage in an automatic mode. Some systems were also designed to provide subirrigation or overhead irrigation in an automatic mode. Based on experience and knowledge in this field, applicants have concluded that these systems generally have not achieved a high degree of reliability in actually delivering this automatic mode of operation. In other words, applicants have concluded that automatic sensing of excess or insufficient moisture within the system, for the purpose of automatically initiating vacuum drainage or subirrigation (and/or overhead irrigation), respectively, has worked better in theory than in actual practice.

Therefore, it is still another object of the invention to increase the reliablity of athletic field drainage systems which include automatic control of features such as vacuum-enhanced drainage or irrigation cycles.

Applicants have also come to recognize that regardless of the degree of complexity and/or the number of features provided by a drainage system for an athletic field, consistent and uniform gravity drainage of excess water remains one of the most important features of an athletic field. To achieve consistency and uniformity in the gravity drainage of excess water from an athletic field, most fields incorporate a drainage pipe system buried beneath the turf. In installing such a drainage pipe system, grading the subsurface to a desired level within a predetermined tolerance and then locating the drainage network beneath the subsurface grade represents a substantial cost. Also, the labor costs associated with actually interconnecting the separate pieces of drainage pipe are relatively high, due to the time required to lay out and interconnect the separate piping pieces at different horizontal levels.

It is still another object of this invention to reduce the costs associated with constructing and installing a drainage network beneath a natural turf athletic field.

SUMMARY OF THE INVENTION

The present invention achieves the above-stated objectives by simplifying interconnection of the structural components of a flow or drainage network of a drainage system for an athletic field, lowering the vertical profile of the drainage network and reducing the excavation and grading costs associated with installing the drainage network. More specifically, the invention achieves these features primarily via use of a plurality of low vertical profile couplings, each coupling located at an intersection of a pipe row partially recessed in a compacted subsoil and a perpendicularly oriented conduit row residing on the subsoil.

The drainage network includes a plurality of parallel rows of water impermeable pipes oriented perpendicular to and intersecting a plurality of parallel rows of water permeable conduits. At each of the plurality of intersections of the pipe rows and the conduit rows, a coupling provides fluid connection between a respective water impermeable pipe and a respective water permeable conduit. The vertical dimension of the coupling is less than the combined vertical dimensions of the pipe rows and the conduit rows. In effect, the coupling allows vertical overlapping of the pipe rows with the conduit rows. This enables the drainage network to be positioned relatively close to the upper surface of the natural turf, or upper surface, of the athletic field, thereby reducing the overall volume of relatively expensive fill layers located between the turf and the subsoil.

Because of the structural configuration and the manner of interconnecting the couplings, the couplings accommodate a plurality of parallel pipe rows which rest on the graded subsoil and a plurality of pipe rows which are partially recessed within depressions excavated in the subsoil. Thus, only placement of the pipe rows, of which there are only five in a typical U.S. football field layout, requires digging below the major portion of the level-graded, compacted subsoil. Compared to prior systems, this minimum excavation significantly simplifies the step of installing the drainage network, regardless of whether the feature of vacuum-enhanced drainage is also provided for the drainage system.

The system preferably uses a water impermeable membrane, or barrier, between the drainage network and the compacted subsoil. The conduit rows rest directly on the membrane above the parallel, major portions of the compacted subsoil. The membrane also extends downwardly into the parallel depressions in the subsoil, so that the membrane in all places resides between the drain network and the subsoil. The water impermeable membrane effectively creates an artificial water table for the natural turf athletic field, to facilitate control of the water level in the field by reference to the level of the water above the membrane. This feature is advantageous for both gravity drainage and vacuum-enhanced drainage of the field.

The low profile couplings also help to reduce the costs associated with installing the membrane. More specifically, the parallel depressions in the compacted subsoil represent the only non-flat surfaces into which the membrane must extend downwardly. Unlike many prior systems which typically had numerous intersecting depressions that made it difficult to completely recess a nonstretchable membrane therein, due to the membrane roll being oriented perpendicular to some of the depressions and parallel to others, for this system it is relatively easy to extend a membrane into a plurality of depressions which are all parallel. The step of installing the membrane does not unnecessarily stress or rip the membrane. Simply providing enough extra "slack" will enable the membrane to conform to the entire graded subsoil, on the flat portions and in the depressions.

According to a preferred embodiment of the invention, a drainage system for an athletic field includes: a water impermeable membrane conforming to a compacted, graded subsoil having a plurality of parallel depressions formed therein and extending along the length of the field; a flow or drainage network located above the membrane and having parallel pipe rows partially recessed within the parallel subsoil depressions and a plurality of conduit rows oriented perpendicular to the pipe rows and located above the non-depressed areas of the compacted subsoil; and a plurality of couplings, each coupling located at an intersection of a pipe row and a conduit row and forming a fluid interconnection thereat.

A fill layer fills in the volume between the membrane and an upper surface of the field, for the volume not occupied by the drainage network. For a natural turf athletic field, an upper portion of the fill layer includes a subsurface rooting medium, including fertilizer, for sustaining the natural turf located thereabove. The drainage network operatively connects to a main pipeline located along one end of the athletic field, and one end of the main pipeline flows to a storm drain, or sewer. The main pipeline leading to the storm drain includes a wet pit with a vertically adjustable upstack located therein, and a valve downstream of the upstack. A drain connects to the wet pit for draining the wet pit and the network by gravity. By selecting the vertical level of the top of the upstack with respect to the vertical level of the membrane, and with the valve closed, the system permits gravity drainage of water therefrom when the water level raises above the top of the upstack.

With these components, this invention achieves a relatively inexpensive drainage system for an athletic field, wherein the field has the features of a level playing surface and uniformity and consistency in gravity drainage. Because of the adjustability of the upstack with respect to the membrane, this system provides a good degree of control over the water level in the field. By selectively setting the vertical position of the upstack with respect to the barrier, the system retains some water in the network. If this amount of retained water is higher than the membrane, the water retained in the network will eventually be absorbed upwardly toward the turf through the fill layer, via capillary action, known in the industry as "wicking".

The invention also contemplates the components necessary for achieving vacuum-enhanced drainage. More particularly, the invention contemplates a subsystem of components which includes: a vacuum drainage line connected to the main pipeline along the first end of the field; a valve located along the vacuum line; a water collection and vacuum tank located at the end of the vacuum/drainage line and which is preferably located below the horizontal level of the field but preferably somewhere off to the side of the field; an air line operatively connected to the buried tank; and a vacuum pump connected to the air line and remotely located with respect to the vacuum tank, and preferably above ground. The vacuum tool retains a small amount of water in its bottom, and submersible pumps mounted on the bottom of the vacuum tank, below the residual water level, pump excess water out of the tank to the drain end of the main pipeline.

To provide vacuum-enhanced drainage, the valve along the vacuum line is opened, and the vacuum pump is actuated to apply vacuum to the fill layer under the surface of the athletic field via the air line, the buried tank, the valve, the vacuum/drainage line, the main pipeline, the pipe rows and the water permeable conduit rows. Also, at least one additional valve is included along the gravity drain line, i.e. through the wet pit, so that this portion of the network may be closed off, or isolated, during vacuum-enhanced drainage.

The components of this subsystem may be included with initial installation of the system, or they may be added to provide this improvement feature at a later date. This may happen if initial financial constraints prevent inclusion of this subsystem with initial installation of the athletic field, and/or if the benefits of this vacuum-enhanced drainage feature become more apparent and more appreciated sometime after installation, and the owner deems the addition of this feature to be necessary or desired. Because of the interrelationship of these subsystem components with respect to the basic, gravity drainage system previously described, this invention facilitates the updating of an in-place system to provide vacuum-enhanced drainage.

If this subsystem is installed initially, the wet pit, the upstack and wet pit valve may be eliminated, thereby to route all drainage through the buried vacuum tank. This would also eliminate the need for a valve adjacent the buried tank, but it would result in the need to pump from the tank, via the submersible pumps, all water which drains from the system. For this reason, this configuration is not preferred.

In a related aspect of the invention, the vacuum-enhanced drainage feature may be provided in an automatic mode of operation. To accomplish this mode of operation, the system further includes a plurality of sensors buried underneath the athletic field, within the fill layer and supported on the membrane. The sensors measure the water level with respect to the membrane, and the sensors convert these measurements into electrical signals which are supplied via buried electrical lines to a controller. The controller operatively connects to the vacuum, upon sensing a predetermined water level above the membrane, the controller automatically signals these components to initiate vacuum-enhanced drainage. Vacuum-enhanced drainage typically continues until the sensors sense the water level at a predetermined low level. In this manner, the controller may cycle the vacuum-enhanced drainage feature on and off, as necessary. Because the sensors measure the water level with respect to the membrane, the water content measurements are extremely reliable, and do not suffer from the problems typical of prior electrical conductivity sensors. If the system includes a wet pit with a valve and upstack, and/or a valve adjacent the buried tank, depending on the configuration of the system, the positions of these valves are preferably operated by the controller, to connect the tank to the network and to disconnect or isolate the wet pit and the gravity drain line from the network.

Additionally, the basic system may be used to subirrigate the athletic field. Subirrigation is done by closing off the valve in the wet pit and then supplying water to the main pipeline. This fills the main pipeline of the drainage network to a vertical level above that of the membrane, to a level determined by the upstack. As a result, water flows outwardly from the drainage network, flows into the fill layer and eventually wicks upwardly to the turf.

Again, as with the vacuum-enhanced feature, this subirrigation feature may be provided in an automatic mode by initiating the subirrigation procedure in response to detection of a low water level above the membrane. If desired, subirrigation may be automatically initiated if a low water level is determined for a predetermined period of time deemed to be excessive with respect to the water needs for the field. Alternatively, the system may initiate overhead irrigation by activating sprinkler heads buried in the field, adjacent the surface.

These and other features of the invention will be more readily understood in view of the following detailed description and the drawings.

BRIEF DESCRIPTION OF THE DRAWINGS

FIG. 1A is schematic cross-section view which illustrates one aspect of gravity drainage of an athletic field drainage system of the type shown in FIG. 1.

DETAILED DESCRIPTION OF THE INVENTION

Figure 1:
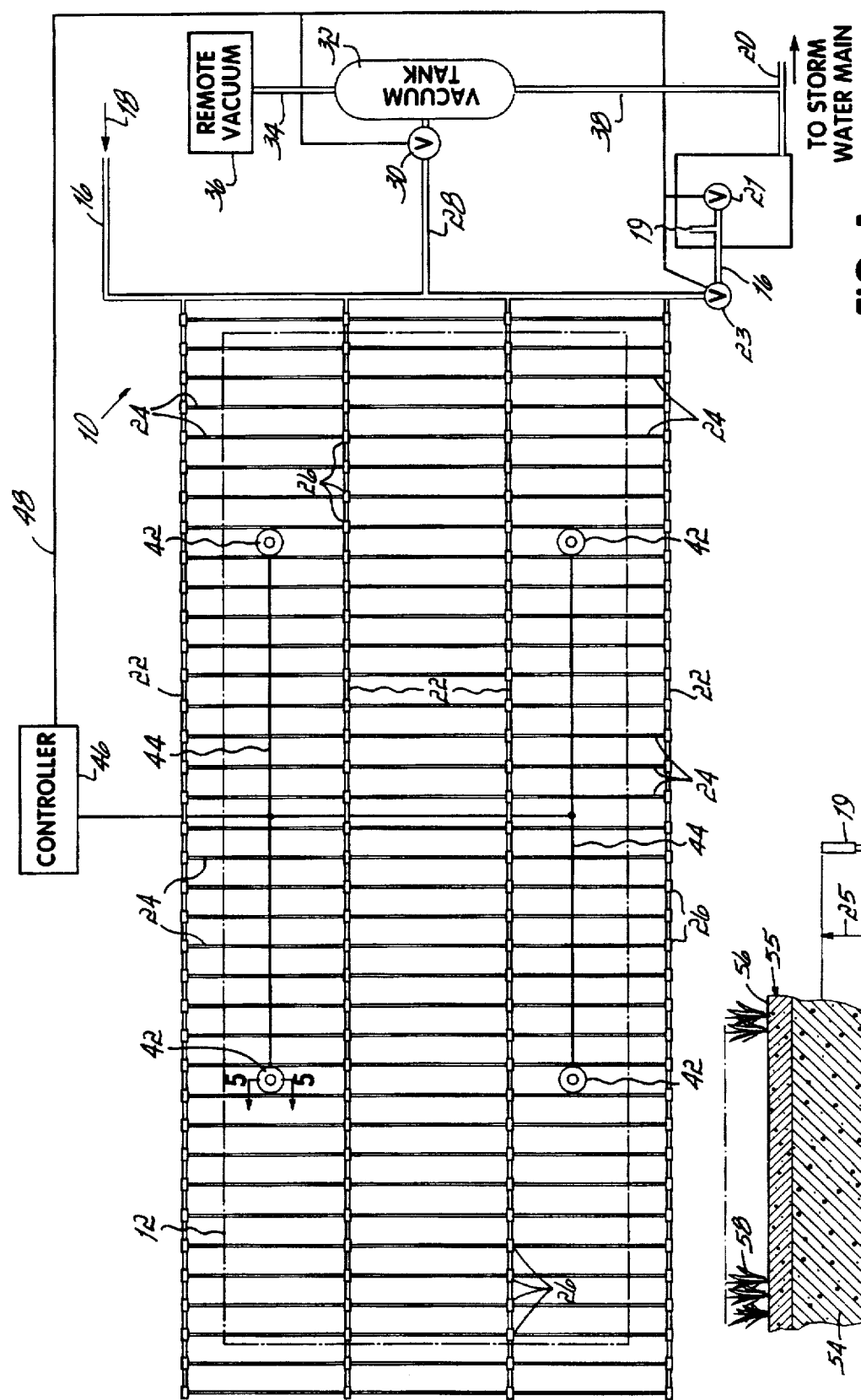
FIG. 1 is a schematic plan view which illustrates an athletic field drainage system constructed in accordance with a preferred embodiment of the invention.

FIG. 1 shows in plan view the components of a low profile drainage system 10 constructed in accordance with a preferred embodiment of the invention. This embodiment of the system 10 includes components necessary for both gravity and vacuum-enhanced drainage, and for subirrigation, if desired. Also, the components which perform vacuum-enhanced drainage, or subirrigation, may be designed to operate in an automatic mode.

The components necessary for vacuum-enhanced drainage may be included upon initial installation, or as an enhancement added at a later date to an already in-place system. Even without the components which provide automation of vacuum-enhanced drainage, or even vacuum-enhanced drainage per se, the system 10 provides numerous benefits in draining an athletic field, which is designated by phantom boundary lines 12.

As shown in FIG. 1, the athletic field 12 has a preferable layout of at least 160 feet wide by 360 feet long. These dimensions are large enough to include a typical U.S. football field. The dimensions may be varied to suit the particular athletic activity. For instance, Canadian football requires a field of somewhat greater length, and international soccer fields are also somewhat larger in dimension. As will be readily understood by those of skill in the art, the invention is not limited to the particular length and width dimensions shown in FIG. 1. For instance, the system 10 could be adopted for use with a baseball field, or even a golf course. Also, while the system 10 is particularly advantageous for a natural turf, or grass, athletic field, the invention contemplates other types of athletic surfaces which do not require a natural grass surface, such as clay tennis courts, etc.

The athletic field 12 shown in FIG. 1 is preferably graded flat, or horizontal, within a specified tolerance. This eliminates difficulties associated with grading a "crown" on the field 12, a step which is usually necessary to facilitate water drainage of a natural turf field. Generally, the system 10 includes a buried flow or drainage network, designated generally by reference numeral 14. This network 14 may also be used for subirrigation. The network 14 includes a main pipeline 16 which is located at a first end of the field 12. One end of the main pipeline 16 is designated for water input for subirrigation, as indicated by reference numeral 18. This end of the main pipeline 16 is operatively connected to a pressurized water source (not shown). The other end of the main pipeline 16 serves as a water drainage outlet, as indicated by directional arrow 20. This end of the main pipeline 16 operatively connects to a storm drain, a sewer or any other structure or conduit for receiving drainage water.

The main pipeline 16 extends into a wet pit 17 located adjacent the field 12. The wet pit 17 is accessible from the surface of the field 12, as by a covered manhole. In the wet pit 17, the main pipeline 16 feeds a vertically extending upstack 19, and the main pipeline 16 terminates at an OPEN/CLOSE valve 21. Thus, the wet pit 17 actually represents a discontinuity in the main pipeline 16. Water flowing from the athletic field 12 by gravity, via the network 14, flows directly into the wet pit 17 if the valve 21 is open. If the valve 21 is closed, the water eventually flows upwardly into the upstack 19 until the water level becomes higher than the vertical level of the upstack 19. At that point, any additional water flows out of the upstack 19 and into the wet pit 17. All water in the wet pit 17 flows outwardly therefrom, by gravity, to the storm sewer, as shown by arrow 20. During normal gravity drainage operation, the valve 21 remains closed, and the vertical level of the upstack 19 is set to a desired level which corresponds to the maximum desired vertical water level in the system 10, as indicated by reference numeral 25 in FIG. 1A.

The variability of the vertical position of the top of the upstack 19 enables the system 10 to better accommodate changes in rainfall during different seasons. Also, considering the different climates in which such fields are used, this variability allows the system 10 to accommodate rainfall differences in different geographic areas.

If desired, water may be supplied to the main pipeline 16 to actively initiate passive subirrigation via the network 14. To accomplish this passive subirrigation, the valve 21 is closed and the upper level of the upstack 19 is located at a desired level above the network 14, so that water supplied to the main pipeline 16 will flow by gravity into the network 14, so long as the water level does not exceed the vertical position of the upstack 19.

The drainage network 14 further includes a plurality of parallel rows 22 of pipes which extend along the length of the athletic field 12 and interconnect with the main pipeline 16 along the first end of the athletic field 12. Preferably, the athletic field 12 includes five pipe rows 22 spaced on centers of about 45 to 55 feet. Preferably, each pipe row 22 comprises a plurality of six inch diameter water impermeable plastic sections interconnected at their ends.

The network 14 also includes a plurality of parallel rows 24 of conduits arranged perpendicular to, and intersecting with, the plurality of pipe rows 22. Preferably, the conduit rows 24 are spaced on about 11 foot centers. The conduit rows 24 preferably comprise drain conduits of the type disclosed in Goddard et al. U.S. Pat. No. 4,904,113, issued on Feb. 27, 1990 and entitled "Highway Edgedrain", the disclosure of which is expressly incorporated by reference herein in its entirety. Generally, this patent shows an elongated highway edgedrain flattened on opposing sides. In the system 10, each conduit row 24 is preferably oriented such that the elongated dimension of the edgedrain is horizontally disposed, parallel with the playing surface of the athletic field 12. This minimizes the vertical profile of the system 10 without reducing water carrying capacity. Also, the edgedrain is reinforced along its shorter dimension to reduce the possibility of breakage when the athletic field 12 must bear a relatively heavy load, such as a fork lift or a truck, or other motorized vehicle, as may be necessary for maintenance or other purposes.

The system 10 includes a plurality of couplings 26, each coupling 26 residing at an intersection of a pipe row 26 and a conduit row 24. The couplings 26 serve as fluid interconnections between the pipe rows 22 and the conduit rows 24. These couplings 26, and their interrelationship with the conduit rows 24 and the pipe rows 22, provide some of the primary advantages of the system 10. More specifically, these advantages relate to lower vertical profile for the system 10, enhanced structural integrity for the system 10, lower cost of components for the system 10 and a significant cost reduction and time savings in installation of the system 10.

The above-described system 10 may be enhanced by adding the components for vacuum-assisted drainage. More specifically, a vacuum/drainage line 28 connects to the main pipeline 16 along the first end of the athletic field 12. An ON/OFF valve 30 resides along the line 28. The vacuum/drainage line 28 interconnects the main pipeline 16 to a water collection and vacuum tank 32, which is preferably located below ground and off to the side of the field 12. An air line 34 operatively connects a remote vacuum 36 to the tank 32. Preferably, the remote vacuum 36 is located above ground, and spaced remotely from the tank 32, as disclosed in Daniel U.S. Pat. No. 5,350,251, entitled "Planted Surface Moisture Control System", the disclosure of which is expressly incorporated by reference herein in its entirety. Another valve 23 resides along main pipeline 16 between the network 14 and the wet pit 17, to isolate the gravity drainage components during vacuum-assisted drainage.

The tank 32 also connects to an outlet drainage line 38, which connects to the outlet end or drain 20 of the main pipeline 16. Preferably, the tank 32 includes one or more submersible pumps (not shown) adjacent the bottom, for pumping water out of the tank 32 to the outlet line 38. A residual amount of water, preferably less than 10–12 inches, remains in the tank 32, to keep the submersible pumps primed.

Together, the vacuum/drainage line 28, the valve 30, the tank 32, the air line 34, the remote vacuum 36 and the drainage line 38 and also the valve 23, cooperate to provide a subsystem for performing the vacuum-enhanced drainage feature for the system 10. As described previously, this feature is particularly useful for draining the athletic field 12 during heavy rainfall. These components are referred to as a separate subsystem, or as a "enhancement", because they are not necessary for obtaining the primary benefits of the system 10. However, these add-on features, or enhancements, offer a higher degree of moisture control for the system 10. Many institutions desire such a feature as part of the initial installation. But for those who decide at a later date, for one reason or another, that this feature is desirable, the present invention readily accommodates retrofitting an in-place system 10 to add this feature.

In a further aspect of this subsystem for performing vacuum-enhanced drainage, particularly for the purpose of automating the control of this subsystem, the system 10 preferably includes a plurality of water level sensors 42 spaced at predetermined positions around the athletic field 12. FIG. 1 shows four such sensors 42, though greater or fewer such sensors 42 may be used, as deemed necessary for the particular surface and/or the athletic activity. The sensors 42 sense the level of water within the entire system 12, and the sensors 42 generate electrical signals used to automatically control switching between gravity drainage and enhanced-vacuum drainage, or even subirrigation or overhead irrigation.

Preferably, to accomplish these features, each of the sensors 42 includes a mechanical float structure for physically sensing the water level in the system 10 and converting the sensed water level to an electrical signal. The sensors 42 connect to buried electrical cables 44 which convey these electrical signals to a master controller 46. The controller 46 operatively connects to the remote vacuum 36, and to valves 30 and 23 via electrical lines 48. Operation of the sensors 42 is described in greater detail with reference to FIG. 5.

Figure 2:
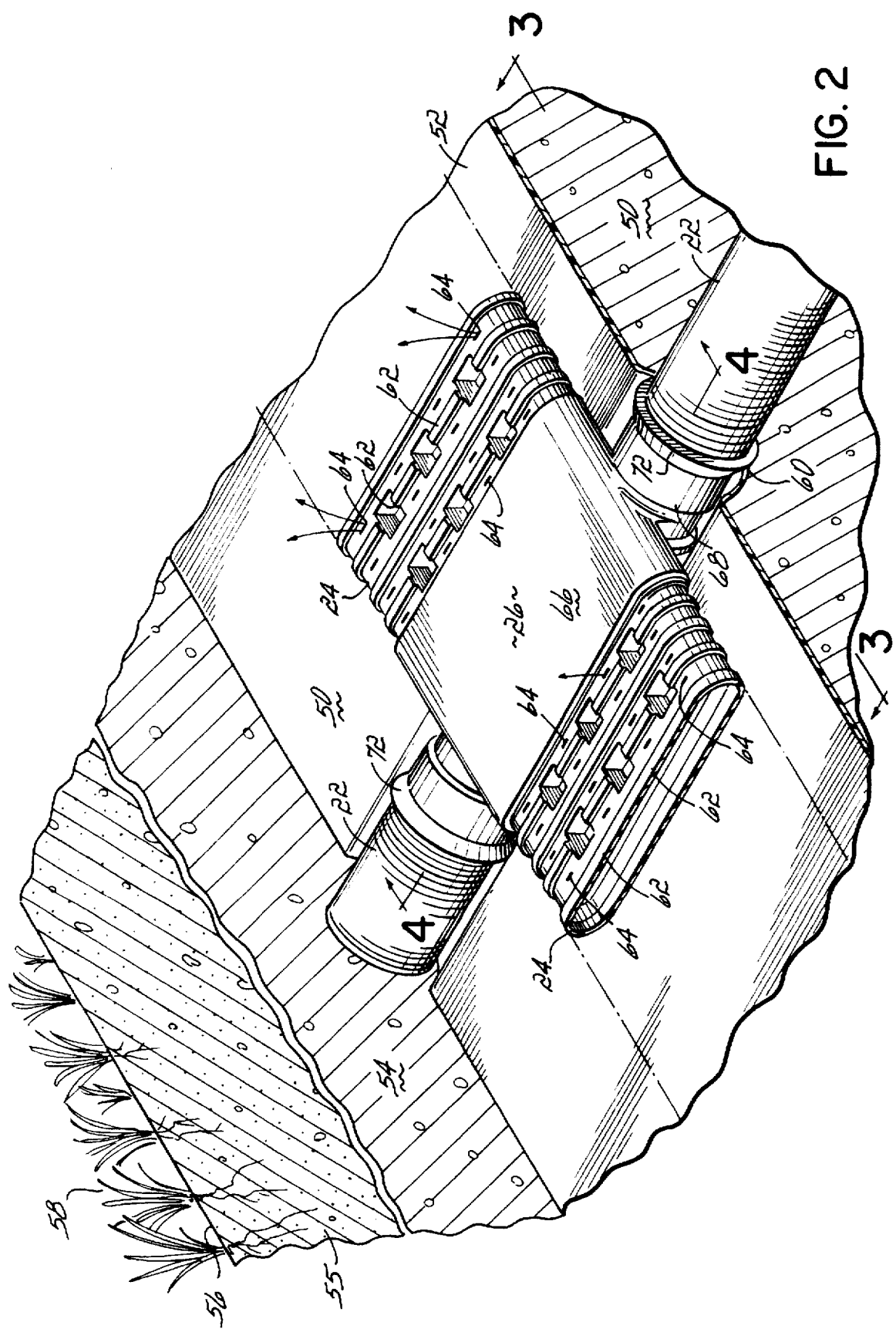
FIG. 2 is a perspective view, partially cutaway, showing a coupling which connects a water permeable conduit to a perpendicularly arranged water impermeable pipe, in accordance with a preferred embodiment of the invention.

FIG. 2 shows one coupling 26 interconnecting one pipe row 22 and one conduit row 24. FIG. 2 also shows in greater detail the level, graded, compacted subsoil 50 located below the system. A water impermeable barrier or membrane 52 resides above the compacted subsoil 50. Preferably, the water impermeable membrane 52 is of polyethylene and has a thickness in the range of 10–20 mils. The membrane 50 rests directly on the parallel major portions of the subsoil 50, which have been graded to be horizontally even, or flat, within a predetermined tolerance. The membrane 52 preferably extends horizontally beyond the length and width dimensions of the field 12, and then extends upwardly to the surface, or adjacent the surface, of the field 12. Thus, the field 12 is actually contained within the membrane 52. The pipe rows 22 extend through the membrane 52 along the edge of the field 12, preferably where the membrane 52 extends vertically toward the surface.

Excluding the drainage network 14, above the membrane 52 the system 10 includes a layer 54 of uniform porous fill media, such as sand. The sand used is preferably relatively course and well graded, i.e. of a grade meeting USGA standards for golf green construction. If desired, an upper portion 55 of the sand layer may be enhanced for turf growth, via components such as peat and/or fertilizers, and possibly synthetic or organic amendments. The upper portion 55 has an upper surface 56 from which planted vegetation such as grass 58 grows. If the system 10 is to be used for an athletic field 12 which does not require natural grass, the upper portion 55 and the grass 58 may be omitted and other materials used. In either case, reference numeral 56 refers to the top surface of the athletic field 12, regardless of the composition.

Figure 3:
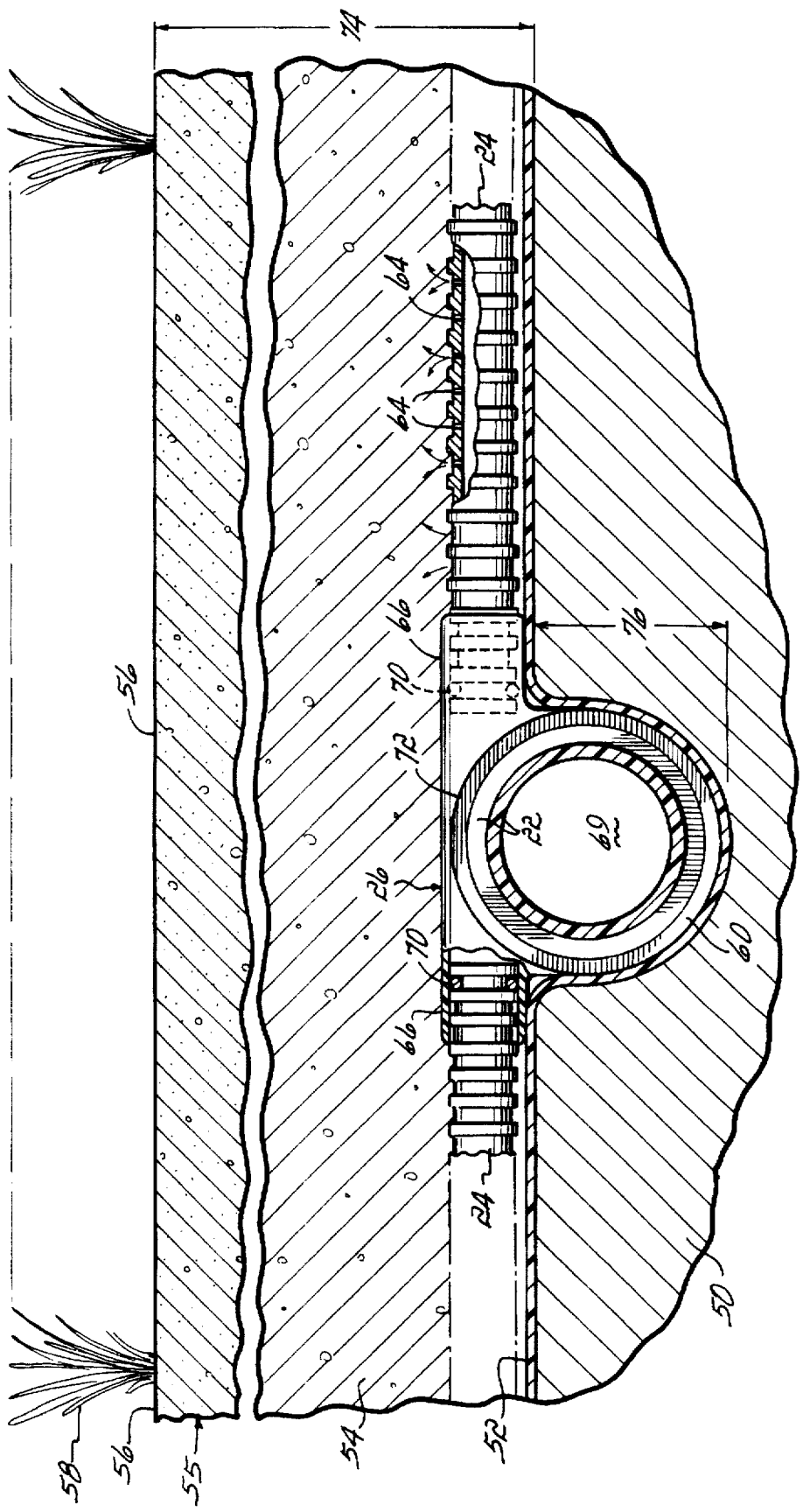
FIG. 3 is a cross-sectional view taken along lines 3—3 of FIG. 2.

With regard to the drainage network 14, FIGS. 2 and 3 show a pipe row 22 partially recessed within the compacted subsoil 50 and resting directly on the portion of membrane 52 located within a groove or depression 60 formed therein. During the initial stages of installing the system 10, during the step of compacting and leveling the subsoil 50, a plurality of such parallel grooves 60 are formed along the length of the athletic field 12, at the locations where the pipe rows 22 will be placed. The formation of these parallel depressions 60 represents the only excavation or digging prior to installation of the membrane 52.

Compared to prior systems for providing vacuum-enhanced moisture control of athletic fields, this system 10 does not require criss-crossed or multiple direction excavations to accommodate each of a variety of differently sized rows of piping. Rather, only a plurality of parallel depressions 60 extending along one direction are necessary, i.e. the length of the field 12. In addition to reducing excavation costs, this greatly simplifies the step of conforming the membrane 52 to the compacted subsoil 50. Because the membrane 52 extends downwardly into depressions 60 which are all parallel, with this invention the step of conforming the membrane 52 does not produce undesired stretching or even tearing, as would inevitably occur with the criss-crossed depressions of prior art systems.

While the pipe rows 22 reside partially in depressions 60 within the compacted subsoil 50, the conduit rows 24 rest directly on the membrane 52, on the parallel, generally flat undepressed portions of the subsoil 50. As shown in FIG. 2, the conduit rows 24 preferably comprise a tube elongated horizontally, with vertical reinforcing structure 62 formed therein. The tops and bottoms of the conduit rows 24 also include a plurality of apertures 64 which render them fluid permeable. Preferably, each of these apertures 64 has a width in the range of about 0.006"–0.009", and a length in the range of about ¾"–1 ¼", so as to render the conduit rows 24 water and air permeable, but to prevent ingress of sand particles. With the pipe rows 22, the use of the low profile, horizontally elongated pipe structure increases drainage water inflow to the network 14 by increasing the soil contact area per unit height, compared to a round shape. Conversely, the pipe rows 22 are water impermeable.

As shown further in FIG. 2, the coupling 26 has upper section walls 66 which define an upper fluid flow channel aligned with the conduit row 24, and lower section walls 68 which define a lower fluid flow conduit aligned with the pipe row 22. These upper and lower fluid flow conduits overlap vertically, and thus are in fluid communication within the coupling 26. The outer ends of the upper section walls 66 are sized and shaped to receive therein the ends of two separate pieces of conduit. Similarly, the lower section walls 68 include enlarged outer ends 72 sized to receive the ends of six-inch diameter pipe.

Interconnection of each coupling 26 with the respective pipe row 22 and conduit row 24 is readily accomplished by hand, without the need for any tools, and results in secure and sturdy interconnection without any fluid leakage. To form the interconnections, a molded rubber gasket 70 and 71, respectively, is lubricated and then forced over the end of at least one corrugation of the conduit or pipe. The gasket extends radially beyond the corrugations. After insertion of the conduit or pipe into the coupling 26, the gasket bears against the inside of the coupling 26, thereby preventing withdrawal and providing a fluid seal. For both the conduits and the pipes, the gaskets are sized according to the respective perimeters. Because of the simple manner in which the couplings 26 are used to interconnect pipe rows 22 with the conduit rows 24, this invention greatly simplifies installation of the drainage network 14, thereby reducing the overall costs of the system 10.

Preferably, the drainage network 14 uses a single piece of rigid pipe between each two couplings 26 and a single piece of conduit between each two couplings 26. Also, to assure the integrity of the fluid seals at the interconnection of the couplings 26 and the ends of the conduit rows 22, it may be desirable to include an external gasket (not shown), to circumferentially secure the connection.

FIG. 3 shows further advantages of the drainage network 14 of this inventive system 10, particularly the advantages which result from use of the couplings 26. More specifically, FIG. 3 shows that the vertical dimension or height of the upper wall section 66 interconnecting a conduit row 24 is less than the vertical dimension or height of the generally cylindrical lower wall section 68 interconnecting a pipe row 22. Further, the overall vertical dimension or height of the coupling 26 is approximately equal to the height of the lower wall section 68. Therefore, the vertical dimension or height between the membrane 52 and the athletic surface 56, represented by reference numeral 74, is minimal. According to applicant's present specifications, this vertical dimension should preferably be about 12 inches, which represents a reduction from the previously required 14 inch, or more, vertical profile of other prior art controlled water table or vacuum-enhanced drainage systems. Due to the relatively high cost of the fill layer 54, which is usually sand, this two-inch reduction of the vertical profile represents a cost savings on the order of about $25,000 per field. Additionally, it may be possible to further reduce the vertical profile 74 to a dimension as low as ten inches, or maybe even lower.

Reference numeral 76 represents the depth of the depressions 60 which must be excavated in the compacted subsoil 50. Preferably, this dimension is about 5 ⅞ inch. As noted above, the system 10 results in lower installation costs because it requires excavation of only five longitudinal depressions 60 of this shape along the length of the field 12. This represents numerous practical advantages over prior water table controlled or vacuum-enhanced drainage systems. Namely, it is much easier to excavate one set of parallel rows at one depth and without any intersections, than multiple sets of rows at multiple depths and with multiple intersections. These multiple excavations also increase the difficulties in maintaining a desired degree of flatness in the subsoil 50 along the entire lengths of the excavated depressions and also the unexcavated portions, a flatness which is necessary to provide a consistent flow line for the system.

In addition to excavating only along parallel lengths, the depths of the depressions 60 are relatively shallow, compared to prior water table controlled or enhanced vacuum drainage systems. This minimizes the difficulties in achieving a relatively flat subsoil base 50 and a level, gravity drainable flow network 14. As noted above, once excavation has been completed, it is much easier to conform a membrane 52 within a plurality of parallel depressions 60 at one level, than a plurality of perpendicular and intersecting depressions at multiple levels. For the most part, the present invention avoids the use of any drains or portions of the network 14 below the barrier 52. In some cases, due to field shapes or sizes, it may be necessary to locate the tank 32 along the longer edge of the field 12, thereby requiring routing of the main pipeline 16 under the field 12 along the side edge, so that each of the pipe rows 22 connects to the main pipeline 16 via a downward connection through the barrier 52. In short, the particular design of the couplings 26 minimizes the vertical profile of the drainage network 14, and the overall system 10. As a result, this coupling 26 significantly reduces installation costs for the system 10.

The couplings 26 are preferably formed by injection molding of high density polyethylene, so that the upper section walls 66 and the lower section walls 68 are integrally formed. The coupling 26 could also be formed by rotation molding. Presently, it is preferable to form the couplings 26 in a single molding process, but the invention also contemplates the molding of separate pieces and then bonding them together as a single piece.

As a result of the present injection molding step for forming the couplings 26, plastic material is left inside the coupling 26 at both ends of both flow passages 67 and 69, and this plastic material must be cut away to access the hollow interior of the coupling 26. For couplings 26 used near the center, or away from the edge of the field 12, this removal of obstructing plastic is performed at both ends of both flow passages of the coupling 26. For the couplings 26 used along the edges of the athletic field 12, i.e. along the outer two pipe rows 22, this flow blocking material is left in place along one side of passage 67. This closes off the network 14 at that point to assure a fluid tight, or closed, system around the outer perimeter of the athletic field 12.

Figure 4:
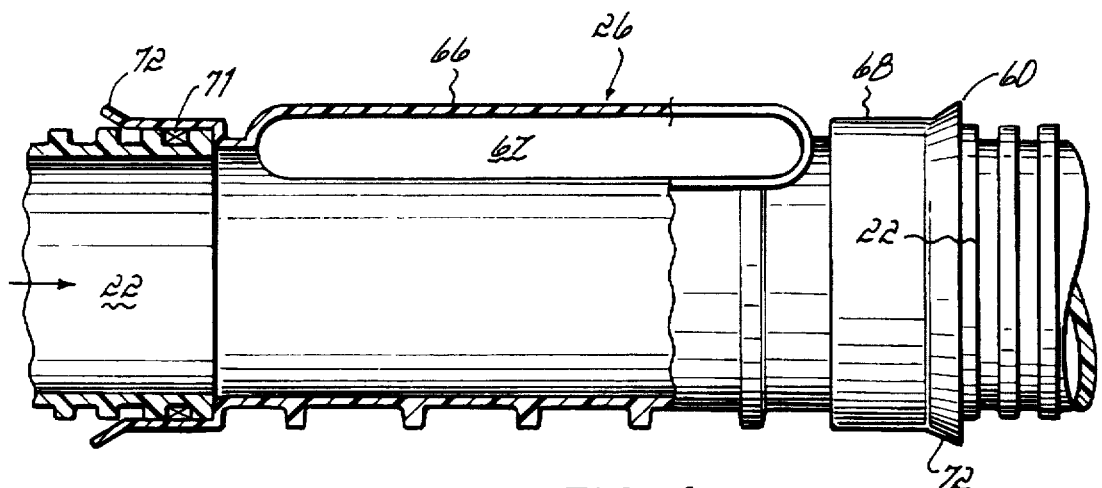
FIG. 4 is a cross-sectional view taken along lines 4—4 of FIG. 2.

FIG. 4 also shows the couplings 26 in cross-sectional view, as viewed in longitudinal cross-section with respect to a pipe row 22, or transverse with respect to the conduit row 24. This view shows a noncircular, horizontally elongated and flattened profile of a vertical cross-section of the upper wall section 66 forming the upper flow passage 67, similar to the manner in which FIG. 3 shows the generally circular profile of a vertical cross-section of the lower wall section 68 forming the lower flow passage 69.

Figure 5:
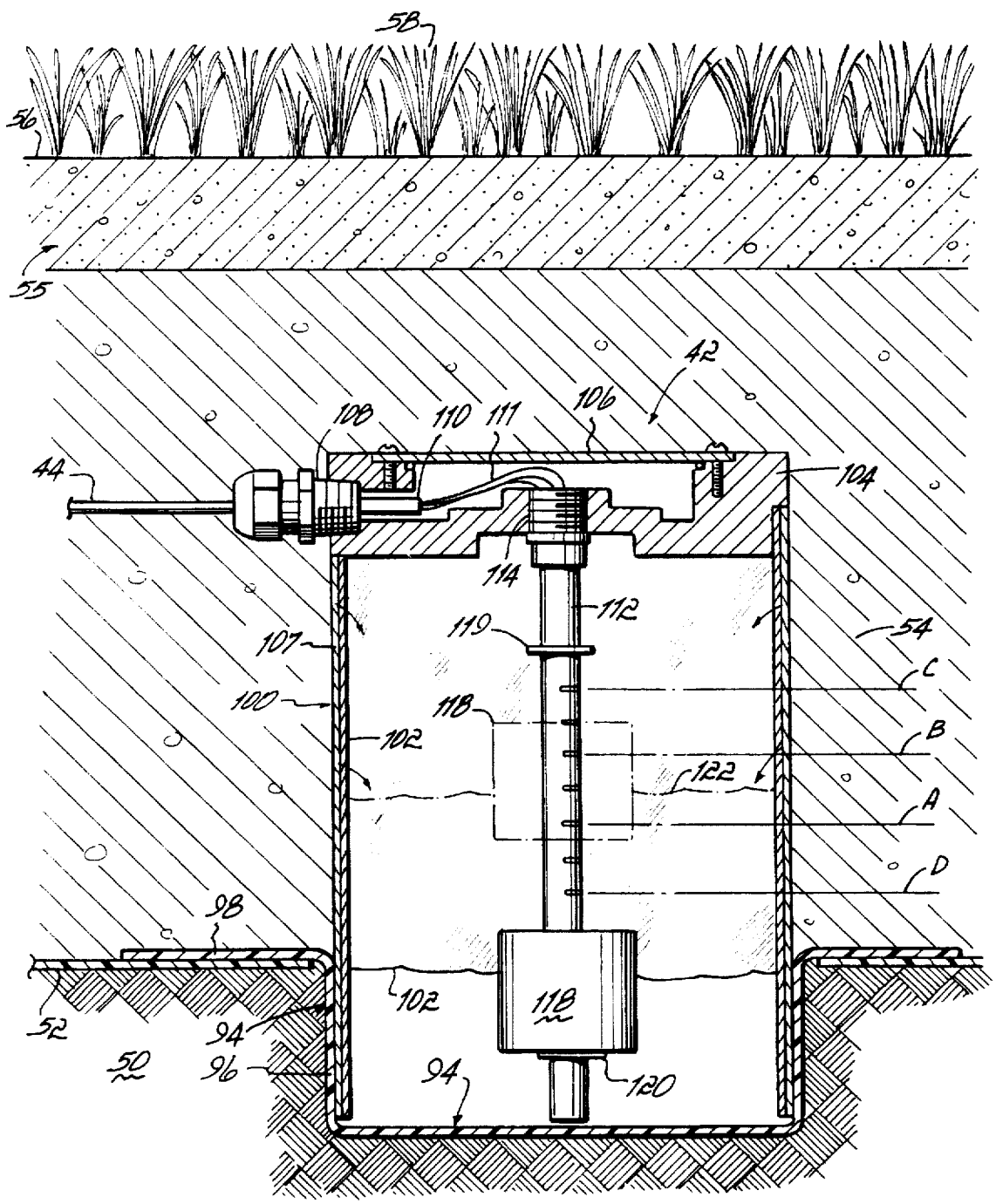
FIG. 5 is a cross-sectional view taken along lines 5—5 of FIG. 1, showing a sensor used in accordance with an automated version of the invention.

FIG. 5 shows a cross-sectional view of a water level sensor 42 constructed in accordance with a preferred embodiment of the invention. As noted above, a plurality of such sensors 42 are buried within the fill layer 54 to measure the level of water above the membrane 52, for the automated version of the system 10, to initiate vacuum-assisted drainage, subirrigation or overhead irrigation. FIG. 1 shows four sensors 42, the preferable number for a typical football field. Each of the sensors 42 includes a cylindrically-shaped housing with water permeable sidewalls, and a mechanical float located therein.

More specifically, as shown in FIG. 5, the sensor 42 includes a bottom plate 94 which is preferably of circular shape. The bottom plate 94 has a central recess defined by recessed cylindrical walls 96, and an upper flange 98. The upper flange 98 rests on the membrane 52. The sensor 42 is cylindrical in shape, but the shape is derived particularly from a cylindrical sidewall 100, which includes an outer screen 101 and an inner screen 102. The outer screen 101 and the inner screen 102 have openings with maximum sizes of about 0.125 inches, and 0.007 inches, respectively, to allow passage of water therethrough but to prevent ingress of sand or other materials into the sensor 42. The sizing of the openings may be varied depending on the composition of the fill layer 54.

The sensor 42 includes a removable top 104 which fits onto and within the sidewalls 100. The removable top 104 further includes a separate access lid 106 held thereto via threaded screws 107. A threaded connector 108 mounts to the side of the removable top, and the threaded connector 108 terminates in an inner sleeve 110 through which electrical leads 111 extend. The electrical leads 111 also connect to a sensing rod 112 which has an upper end 114 thereof threaded into the removable top 104. The sensing rod 112 preferably includes spaced sensing gradations 116 which are about ¼ of an inch apart, although a spacing of about every ½ inch would also be suitable. Above and below the gradations 116, the sensing rod 112 includes an upper stop 119 and a lower stop 120 which limit upward and downward movement, respectively, of a float 118 mounted on the sensing rod 112. The float 118 is annular in shape, and it moves vertically along the sensing rod 112 according to the vertical level of water within the sensor 42.

Via the gradations 116, the sensing rod 112 measures the vertical position of the float 118, and the sensed vertical position is converted to an electrical signal. More specifically, at each gradation 116, the sensing post 112 includes a presence sensor such as a switch which is mechanically or electromagnetically actuated by the float 118, to detect water level above the barrier 52. If sensing is done electromagnetically, the float 118 must have a magnetically permeable portion, such as a small piece of metal mounted thereon. Regardless of the specific details of construction used to sense the water level, the device should sense water level in increments of preferably ¼ inch, or at least increments of ½ inch.

In FIG. 5 the sensor 42 is shown recessed within the compacted subsoil 50. This is necessary because of the particular configuration of the sidewalls 100 and the shape and dimension of the sensing rod 112 and the mechanical float 118. The sizing of these components is such that the float 118 does not vertically raise from its bottommost rest position on stop 120 until the water level, designated by reference numeral 122, raises above the vertical level of the membrane 52 radially outside of the sensor 42. In other words, with this particular sensor 42, the shape and dimensions of the float 118 require that it be recessed slightly within the compacted subsoil 50.

To recess the sensor 42, the membrane 52 is cut at the desired position, and the radially surrounding flange 98 is sealed to the membrane 52 around the outside of the sensor 42 to maintain a liquid barrier between the fill layer 54 and the compacted subsoil 50. However, if desired, the sensor 42 may be configured in such a manner that does not require recessing within the compacted subsoil 50. This could be done simply by changing the dimensions of the float 118 with respect to the sensing rod 112, or even by taking readings from the bottommost position of such a mechanical float 118.

Figure 6:
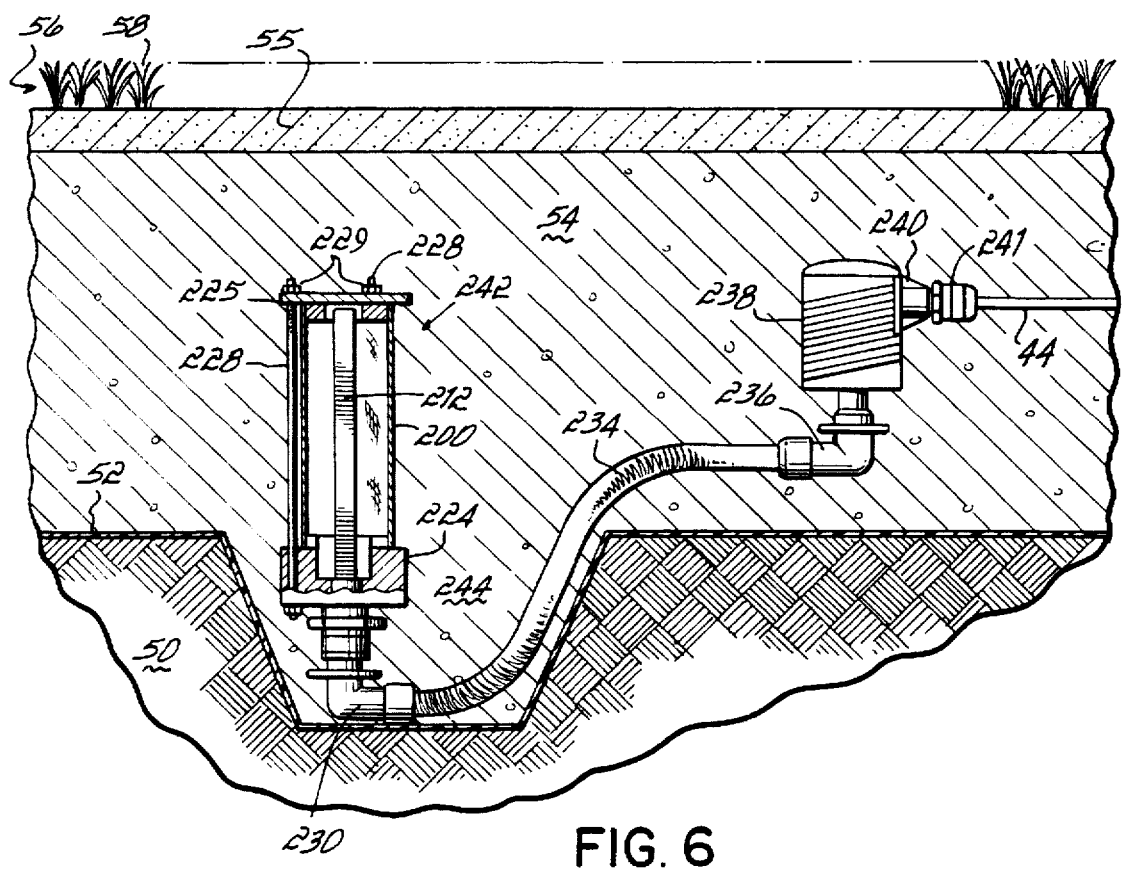
FIG. 6 is a cross-sectional view, similar to FIG. 5, which shows another version of a sensor for operation of the system in automatic mode.

As a further alternative, it would also be possible to modify the sensing rod 112 so that the water level is measured without the use of a float 118. For instance, as shown in FIG. 6, the water level 122 may be measured by a sensor 242 with an elongated probe 212 having an outer metal surface which acts as one "plate" of a capacitor. This capacitive probe 211 is a shortened version, i.e. about 8 ⅞ inches, of other commercially available elongated capacitive probes manufactured and sold under the trademark SYM-PROBE by a company called Flowline, located in Seal Beach, Calif. Because of the electrical conductivity of water, the total surface area of the probe 212 in contact with the water, i.e. the surface located below the water level 122, will affect the capacitive reading of the probe 212, and thereby proportionally affect the electrical current flowing in the sensor 242. By calibrating the sensor 242, measured water levels can be correlated to measured capacitances, and hence the amount of electrical current can be correlated to the actual water level 122.

FIG. 6 shows structural details of sensor 242, including spaced first and second caps, 224 and 225, respectively, which are secured together by a plurality of elongated clamping screws 228 held by nuts 229. This structure secures a cylindrical housing 200 which is similar in construction to housing 100 shown in FIG. 5. Housing 200 also has inner and outer screens but a lower diameter, i.e. about 3.5 inches. The capacitative probe 212 is located in the housing 200, oriented vertically, and is supported vertically by the first cap 224. The first cap 224 is thicker than the second cap 225 to accommodate the probe 212.

The first cap 224 is preferably closer to the membrane 52 than the second cap 225, because of the manner in which a right angled fitting 230 extends outwardly from first cap 224. The fitting 230 securely holds the probe 212 with respect to the housing 200. While this sensor 242 could be turned over and still used to sense water level 122, the fitting 230 would probably be too close to the surface 56.

For this reason, for this sensor 242, it is preferable to use the approach shown in FIG. 6, that of recessing the first cap 225 and the fitting 230 within a recess 294 in the subsoil 50, with the membrane 52 conforming to the recess 294. The depth of recess 294 corresponds to the vertical dimension of the fitting 230 and first cap 224. A flexible hose 234 interconnects fitting 230 to a remote fitting 236, which connects to an enclosed cylindrical housing 238 which encases the electronics. The housing 238 includes a threaded extension 240 to which a hexagonal nut 241 connects, to secure the cable 44 thereto. The components of housing 238 are commercially available from Flowline, and sold in combination with the probe 212.

With this capacitance probe 212, current flow output from the sensor 242 fluctuates within the range of 4 and 20 milliamps. Within this range, the upper and lower current level extremes are correlated to predetermined high and low water levels 122 (reference levels C and D), respectively, which correspond to the need to initiate vacuum-assisted drainage and the need to irrigate. Between these two extremes, at least two additional settings are determined for initiating gravity drainage (reference level B) and for simply maintaining a predetermined optimum water level 122 (reference level A), where no change to the system 10 is initiated.

Whichever manner of water level measurement is chosen, it is preferred that this measurement be taken via measurement of the physical presence of some substance, such as water, a float, etc., within the water permeable housing buried in the fill layer 54. This is due primarily to the lack of reliability of previously used moisture sensors for automatic control of vacuum-enhanced drainage, subirrigation, or overhead irrigation in prior drainage systems for athletic fields.

Primarily, sensors for such systems relied upon the electrical conductivity of the fill layer located below the natural turf surface 56. However, readings of this nature may be affected by temperature, season, and perhaps mostly by the composition and quantity of fertilizer on and below a typical natural turf athletic field, because many fertilizers include electrically conductive elements or materials. Because the distribution of such fertilizer is never entirely even over the entire surface, the "fertilizer effect" may be different at different locations of the field. This could result in different electrical conductivity readings from sensors placed in different positions of a field, despite a uniformity in water content throughout the field. In sum, for various reasons, applicant has learned that for many prior automatic drainage systems the moisture readings taken have not accurately reflected the moisture level of the field.

In short, the system 10 of this invention, if adapted for vacuum-enhanced drainage or subirrigation in an automatic mode, contemplates the use of a plurality of sensors 42 which, through any one of a number of different methods, measure the actual physical level of the water above the barrier 52. This approach simplifies the components involved with sensing the water content within the field 12, it simplifies automated control of vacuum-enhanced drainage and/or irrigation for such a system 10, and it enhances reliability.

To install the system 10, the subsoil 50 is compacted at a desired horizontal level within a predetermined tolerance range, and a plurality of excavated depression 60 are formed along the length of the field 12. A membrane 50 is then placed on the compacted subsoil 50, with most of the membrane 52 residing on flat, parallel undepressed portions of the compacted subsoil 50, but with some of the membrane 52 extending downwardly into the parallel depressions 60, to conform to the topography of the excavated subsoil 50. Because the membrane 52 is usually purchased in rolls about 22.5 feet wide, the seams are heat welded together after unrolling at the site, to assure water tight seals between adjacent rolls.

A plurality of pipe rows 22 are laid out along the depression 60, above the membrane 52. At each of the intersections of the plurality of parallel longitudinal pipe rows 22 and the plurality of parallel conduit rows 24, one of the couplings 26 is placed. Preferably, in each pipe row 22 and in each conduit row 24, a single piece extends between every two intersections. For the conduit rows 24, the edgedrain described in the above-identified Goddard patent is typically sold and shipped in rolls, so that it may be simply unrolled into the desired positions, and cut at the intersections at the desired lengths.

At each intersection, the ends of the pipe row 22 are connected to the ends of the lower section walls 68 of the coupling 26 to connect the coupling 26 in alignment therewith. Thereafter, the ends of the conduit row 24 are connected to the upper wall sections 66 of the coupling 26. For both connections, interconnection is made simply by first locating the internal gasket in place, and then inserting the pipe or conduit into the coupling 26, to provide a fluid tight interference fit.

As indicated previously, in interconnecting the conduit rows 24 with the couplings 26, it may be desirable to add circumferential gaskets at the junctions of the conduit ends and the ends of the upper wall sections 66 of the couplings 26, to assure fluid tight connection. Regardless, all of the connections made to complete the drainage network 14 may be done manually, without requiring tools.

Thus, the grading and excavating of the subsoil 50, the placement of the membrane 52 and the installation of the drainage network 14 have been greatly simplified, resulting in a reduction in costs. After these initial steps, the fill layer 54 is filled in over the membrane 52, to bury the drainage network 14. The main pipeline 16 connects in parallel to each of the pipe rows 22 along one end of the field 12. The main pipeline 16 is constructed so as to provide access at one end thereof to a water supply source 18, and routing at another end thereof 20 to a storm drain. This latter step includes installation of a wet pit 17 along the flow path to the storm drain 20, along with the valve 21 and the vertically adjustable upstack 19.

On top of the fill layer 54, the surface 56 for an athletic field 12 is formed by supplying the additional rooting layer 55 for sustaining growth of natural turf 58. These steps result in the basic system 10 which provides the primary advantages of this invention. With this basic system 10, the water level 25 may be manually controlled to some extent. With the valve 21 closed, gravity flow drainage occurs when the water level 122 exceeds the distance 25 of the upstack 19 above the barrier 52. The field 12 may also be irrigated by selecting the level of the upstack 19 and supplying water to the main pipeline 16, again with valve 21 closed. In this manner, water flows directly into the network 14 and onto the barrier 52 for upward absorption to the turf 58.

Additionally, the feature of vacuum-enhanced drainage may be added to the system 10. This is done by adding the vacuum/drainage line 28, the second valve 30, the buried collection tank 32, the air line 34 and the vacuum pump 36, preferably remote from the vacuum tank 32 and located above level of the field 12. Also, the valve 23 is added to the main pipeline 16, to isolate the drain 20. As described previously, these components cooperatively interact to provide vacuum-enhanced drainage for the system 10. These components may be added during initial installation of the system 10, but the system 10 is also configured so that these components may be added relatively easily at a later date, to provide this feature as an update or as an enhancement.

If added initially, all drainage may occur through the tank 32, but this is not preferred, because it would result in the need to pump all drained water from the tank 32. Thus, the dual, parallel gravity/vacuum drainage capability is preferred.

As a further enhancement, either at initial installation or during updating, the system 10 may also include the components for automatically controlling vacuum-enhanced drainage, or even irrigation, via subirrigation or overhead irrigation. To do this, the plurality of sensors 42 are buried within the field 12, such that each sensor 42 measures the level of the water above the membrane 52 in that particular section of the field 12. The sensed water level signals are converted to electrical signals and conveyed to the controller 46 via buried electrical lines 44. The controller 46 is preferably programmably controlled to coordinate operation of the other components to provide vacuum-enhanced drainage, gravity drainage, subirrigation or overhead irrigation, if desired, depending upon the manner in which the controller 46 is programmed and the water level sensed by the sensors 42. The controller 46 may also be configured to conserve water, by maintaining valves 23 and 30 in a closed position to keep water in the system.

Ideally, with automatic control via use of the controller 46 and the sensed water level signals from the sensors 42, the system 10 enables an optimum water level 122 above the membrane 52 to be maintained. For instance, as shown in FIG. 5, reference level A represents an optimum water level 122. If rain begins, and the water level 122 reaches reference level B, the controller 46 opens valve 23 to allow gravity drainage of the network 14. Valve 30 is closed also, if necessary. This condition continues until the water level 122 recedes back to level A. However, if the water level 122 continues to rise, to a maximum level, indicated by reference level C, the controller 46 closes valve 23, opens valve 30 and activates vacuum 36 to begin vacuum-assisted drainage of the system 10. The vacuum assisted drainage continues until the water level 122 recedes back to level B, at which time the controller 46 signals the necessary components to switch back to gravity drainage.

If the water level 122 goes back up to level C, the controller 46 again initiates vacuum assisted drainage. On the other hand, if the water level 122 falls back to the maintenance level A, the controller 46 closes valves 23 to discontinue gravity drainage.

If the water level 122 recedes from the desired level A, to a predetermined low level designated by letter D, the controller initiates irrigation, either via subirrigation by supplying water to the main pipeline 16, with valves 23 and 28 closed, or by activating subsurface overhead sprinklers, (not shown) as is known in the industry.

Even with the automated version of the system 10, it may be preferable during the off-season, for cost reasons, to simply disable the controller 46 to gravity drain the network 14 via the upstack 19.

While several preferred embodiments of the inventive method have been described, it is to be understood that the invention is not limited thereby and that in light of the present disclosure, various other alternative embodiments will be apparent to a person skilled in the art. For instance, the drain network 14 could be oriented such that the pipe rows 22 extend transverse to the field 12, and so that the conduit rows 24 extend longitudinally. In some cases, the tank 32 may be located somewhere other than along one of the longitudinal ends of the field 12, depending on spacing and dimensions in the stadium with respect to adjacent stands. Also, the rolls which are heat welded to form the membrane 52 may be oriented either perpendicular to the depressions 60 during unrolling, as described previously, or parallel thereto. Accordingly, it is to be understood that changes may be made without departing from the scope of the invention as particularly set forth and claimed.

We claim:

1. A drainage system for an athletic field located above a compacted subsoil, the system comprising:

a drainage network including a first plurality of parallel rows of water permeable conduits located above the compacted subsoil and a second plurality of parallel rows of water impermeable pipes partially recessed within the subsoil, the first plurality of parallel conduit rows being perpendicular to and intersecting the second plurality of parallel pipe rows; and a plurality of couplings, each coupling located at an intersection of a pipe row and a conduit row and providing a fluid interconnection thereat, each of the couplings having a conduit interconnecting portion with a noncircular transverse cross-sectional shape, and each of the couplings having a pipe interconnecting portion with a transverse cross-sectional shape different from the noncircular transverse cross-sectional shape.

2. The drainage system of claim 1 and further comprising:

a water impermeable membrane located between the subsoil and the drainage network.

3. The drainage system of claim 1 wherein each coupling further comprises:

upper section walls aligned with the respective conduit row and defining an upper fluid flow channel in fluid communication with said respective conduit row; and lower section walls aligned with the respective pipe row and defining a lower fluid flow channel in fluid communication with said respective pipe row, the upper and lower fluid floor channels being vertically overlapped.

4. The system of claim 1 wherein the pipe rows are partially recessed in depressions formed in the subsoil and the remainder portions of the subsoil are horizontal, within a predetermined tolerance range, and the vertical dimension of the depressions is less than the vertical distance between a top surface of the athletic and the remainder portions of the subsoil.

5. The system of claim 1 wherein the athletic surface comprises natural grass and further comprising:

a fill layer residing between the subsoil and the athletic surface.

6. The system of claim 1 wherein each of the conduits has a flattened elongated shape in transverse cross-section, with flat upper and lower surfaces, and a fluid passage therethrough has a substantially greater width than height.

7. The drainage system of claim 4 wherein the vertical dimension of the coupling is less than the vertical distance between the athletic surface and the remainder portions of the subsoil.

8. The drainage system of claim 1 wherein each of the couplings is integrally molded out of a homogenous material.

9. A drainage system for a natural turf athletic field located above a compacted subsoil comprising:

a water impermeable membrane residing on and conforming to a compacted subsoil, the membrane having a first plurality of parallel flat portions and a second plurality of recessed portions conforming to a like number of depressions formed in the compacted subsoil;

a flow network located above the membrane, the network including parallel rows of water permeable conduit located above the flat portions of the membrane and parallel rows of water impermeable pipe partially recessed within the depressions, the conduit rows arranged perpendicular to and intersecting the pipe rows, the network further including a plurality of couplings, each coupling located at an intersection of a pipe row and a conduit row and providing a fluid interconnection thereat, each of the couplings having a conduit interconnecting portion with a noncircular transverse cross-sectional shape, and each of the couplings having a pipe interconnecting portion with a transverse cross-sectional shape different from the noncircular transverse cross-sectional shape;

a fill layer located above the membrane and surrounding the flow network, the fill layer comprising a particulate material predominantly of a size and dimension so as to not permeate the water impermeable coupling rows, the fill layer have a depth reduced by the coupling having a height less than the sum of the heights of the conduit and pipe rows;

a natural turf surface located above the fill layer; and a fluid outlet located below the flow network and operatively connected to at least one of the pipe rows, the outlet terminating at a drain, whereby water landing on the turf surface eventually flows by gravity into the flow network and away from the field via the fluid outlet.

10. The drainage system of claim 9 wherein the fluid outlet comprises:
   a wet pit operatively connected to the drain for outflow of water therefrom by gravity;
   an inlet extended into the wet pit;
   a vertically movable upstack located in the wet pit and operatively connected to the inlet;
   a first open/close valve operatively connected to the inlet, to open and close fluid access between the inlet and the wet pit; and
   the upstack vertically movable to a selected vertical position above the vertical level of the flat portions of the membrane, thereby to establish a preferred water level for the system so that, when the first valve is closed, any additional water above the preferred water level flows away from the field by gravity, via the flow network, out the upstack, into the wet pit and then to the drain.

11. The drainage system of claim 10 and further comprising:
   a vacuum line operatively connected to the flow network;
   a second open/close valve located along the vacuum line;
   a tank located beneath the turf surface and operatively connected to the flow network via the vacuum line, with the valve therebetween; and
   a vacuum operatively connected to the tank, the vacuum adapted to apply vacuum to the flow network through the tank, the vacuum line and the second valve, whereby the applied vacuum enhances drainage of water from the field via the flow network.

12. The drainage system of claim 11 and further comprising:
   a plurality of sensors below the turf surface at remotely spaced positions around the field and located on the flat portions of the membrane, each sensor adapted to sense the vertical level of water with respect to the flat portions of the membrane and to convert said sensed vertical level to an electrical signal; and
   a controller operatively connected to the sensors, the vacuum and the first and second valves, the controller operative to receive the water level signals from the sensors and in response thereto, to automatically control the vacuum and the first and second valves to affect vacuum-assisted drainage of the field via the flow network.

13. The drainage system of claim 12 wherein the controller is programmable to selectively vary automatic control of vacuum-enhanced drainage.

14. The drainage system of claim 10 wherein a water supply source operatively connects to the flow network, thereby to allow active initiation of passive subirrigation of the athletic field by supplying water to the network.

15. The drainage system of claim 12 wherein a water supply source operatively connects to the flow network and the controller operatively connects to the water supply source, thereby to affect subirrigation in an automatic mode.

16. In a drainage system for an athletic field having an athletic surface located above a compacted subsoil, including a drainage network and a fill layer located between the subsoil and the surface, the drainage network including a plurality of parallel rows of pipes intersected by a perpendicularly arranged plurality of rows of conduits, the system comprising:
   a plurality of couplings, each coupling located at an intersection of a pipe row and a conduit row and providing a fluid interconnection thereat, the pipe rows having a first height and the conduit rows having a lesser height, the couplings having a height approximately equal to the first height to reduce a thickness of the fill layer.

17. The drainage system of claim 16 wherein each coupling further comprises:
   first wall sections defining a first flow passage for connection into alignment with a respective conduit row; and
   second wall sections defining a second flow passage for connection into alignment with a respective pipe row, the first and second flow passages being in fluid communication and vertically overlapped.

18. The drainage system of claim 17 wherein the first wall sections and the second wall sections are integral.

19. The drainage system of claim 17 wherein the couplings are formed by injection molding.

20. The drainage system of claim 19 wherein the couplings comprise high density polyethylene.

21. The drainage system of claim 17 wherein for each coupling the first flow passage is horizontally elongated in transverse cross-section and the second flow passage is circular in transverse cross-section.

22. The drainage system of claim 17 wherein each of the first wall sections has a pair of opposite ends which manually connect to a respective conduit and each of the second wall sections has a pair of opposite ends which manually connect to a respective pipe.

23. A method of installing a drainage system for an athletic field comprising the steps of:
   excavating and compacting a subsoil to achieve a horizontally flat surface for the field, including forming a plurality of parallel rows of depressions which extend therebelow;
   conforming a water impermeable membrane to the excavated and compacted subsoil;
   placing a plurality of water impermeable pipe rows in the parallel depressions, above the membrane;
   placing a plurality of water permeable conduit rows perpendicular to the pipe rows and above the membrane, thereby to define a plurality of intersecting points;
   at each intersecting point, interconnecting a coupling to the respective conduit row and to the respective pipe row to provide a fluid interconnection therebetween, each of the couplings having a conduit row interconnecting portion with a generally horizontally elongated cross-sectional shape and a pipe row interconnecting portion with an arcuate cross-sectional shape;
   covering the pipe rows and the conduit rows with a fill layer for supporting a top surface for the field; and
   operatively connecting the pipe rows to a main pipeline which leads to a drain, whereby water running into the water permeable conduit rows flows into the pipe rows, to the main pipeline and to the drain, for gravity drainage of the field.

24. The method of claim 23 and further comprising the step of:
   operatively interconnecting, to the pipe rows, the components of a subsystem for performing vacuum-enhanced drainage of the field.

25. The method of claim 24 and further comprising the step of:

locating a plurality of water level sensors in the field, each sensor adapted to sense the water level with respect to the membrane; and operatively connecting a controller to the sensors and to the subsystem, thereby to provide an automatic mode for operating the subsystem to perform vacuum-enhanced drainage.

26. A drainage system for a natural turf athletic field located above a compacted subsoil comprising:

a water impermeable membrane residing on and conforming to a compacted subsoil, the membrane having a first plurality of parallel flat portions and a second plurality of recessed portions conforming to a like number of depressions formed in the compacted subsoil;

a flow network located above the membrane, the network including parallel rows of water permeable conduit located above the flat portions of the membrane and parallel rows of water impermeable pipe partially recessed within the depressions, the conduit rows arranged perpendicular to and intersecting the pipe rows at a plurality of intersecting points to provide fluid interconnections at the intersecting points, the conduit rows and the pipe rows being vertically overlapped at the intersecting points;

a fill layer located above the membrane and surrounding the flow network, the fill layer comprising a particulate material predominantly of a size and dimension so as to not permeate the water permeable coupling rows;

a natural turf surface located above the fill layer; and a fluid outlet located below the flow network and operatively connected to at least one of the pipe rows, the outlet terminating at a drain, whereby water landing on the turf surface eventually flows by gravity into the flow network and away from the field via the fluid outlet.

27. The drainage system of claim 26 wherein the flow network further comprises:

a plurality of couplings, one coupling located at each intersecting point to interconnect a respective pipe row to a respective conduit row thereat.

28. In a drainage system for an athletic field having an athletic surface located above a compacted subsoil, including a drainage network and a fill layer located between the subsoil and the surface, the drainage network including a plurality of parallel rows of pipes intersected by a perpendicularly arranged plurality of rows of conduits, the system comprising:

at least one coupling located at an intersection of a pipe row and a conduit row and providing a fluid interconnection thereat, a first portion of the coupling interconnecting the pipe rows and having a first height and a second portion of the coupling interconnecting the conduit rows and having a second height less than the first height, the coupling having a height approximately equal to the first height to reduce a thickness of a fill layer.

29. The system of claim 28 wherein the first portion of the coupling is disposed lower in the coupling than the second portion of the coupling.

30. The system of claim 28 wherein the first portion of the coupling has an uppermost surface contiguous with an uppermost surface of the second portion of the coupling.

31. A drainage system for an athletic field located above a compacted subsoil, the system comprising:

a water impermeable membrane residing on and conforming to a compacted subsoil, the membrane having a first plurality of parallel flat portions and a second plurality of recessed portions conforming to a like number of depressions formed in the compacted subsoil;

a drainage network located above the membrane, including a first plurality of parallel rows of water permeable conduits substantially resting on the flat portions of the membrane, and a second plurality of parallel rows of water impermeable pipes perpendicular to and intersecting the first plurality of parallel rows of conduits, the second plurality of parallel rows of pipes substantially resting on the recessed portions of the membrane; and a plurality of couplings, each coupling being located at an intersection of a row of pipes and a row of conduits and providing a fluid interconnection thereat, each coupling having an upper horizontally elongated conduit coupling portion substantially resting on a flat portion of the membrane and forming part of a respective conduit row, and a lower generally circular pipe coupling portion substantially resting on a recessed portion of the membrane and forming a part of a respective pipe row, the upper and lower coupling portions being generally complementary in shape with the membrane at the intersection and resting on the membrane on the compacted subsoil to provide maximum support for the drainage network.

32. In a drainage system for an athletic field having an athletic surface located above a compacted subsoil, including a drainage network and a fill layer located between the subsoil and the surface, the drainage network including a plurality of parallel rows of pipes intersected by a perpendicularly arranged plurality of rows of conduits, the system comprising:

at least one coupling located at an intersection of a pipe row and a conduit row and providing a fluid interconnection thereat, a first portion of the coupling interconnecting the pipe rows and having a first cross-sectional shape, and a second portion of the coupling interconnecting the conduit rows and having a second different cross-sectional shape, the second cross-sectional shape providing greater contact with the fill layer to increase drainage of water inflow to the system.

33. The drainage system of claim 32 wherein the first cross-sectional shape is a substantially circular shape and the second cross-sectional shape is a noncircular shape.

34. The drainage system of claim 33 wherein the second cross-sectional shape is generally elongated.

35. The drainage system of claim 34 wherein the second cross-sectional shape is generally horizontally elongated.

* * * * *